United States Patent [19]

Kiuchi

[11] Patent Number: 4,501,630
[45] Date of Patent: Feb. 26, 1985

[54] METHOD OF SPLICING A MAGNETIC RECORDING TAPE AND A LEADER TAPE

[75] Inventor: Seiji Kiuchi, Odawara, Japan

[73] Assignee: Fuji Photo Film Co., Ltd., Minami-ashigara, Japan

[21] Appl. No.: 562,718

[22] Filed: Dec. 19, 1983

[30] Foreign Application Priority Data

Dec. 24, 1982 [JP] Japan .................... 57-229178

[51] Int. Cl.³ .................... B31F 5/06; B65H 69/06
[52] U.S. Cl. .................... 156/159; 156/304.3; 156/505; 156/507
[58] Field of Search .................... 156/159, 304.3, 505, 156/506, 507, 157

[56] References Cited

U.S. PATENT DOCUMENTS 2,844,186 7/1958 Sunnen, Jr. .................... 156/507
3,917,184 11/1975 King .................... 156/507
4,369,779 1/1983 Spencer .................... 156/159

Primary Examiner—Michael Wityshyn
Attorney, Agent, or Firm—Curtis, Morris & Safford

[57] ABSTRACT

A feed table and a receiving table respectively having top surfaces which are flush with each other are positioned spaced from each other by a very small distance. A magnetic recording tape is fed along the top surface of the feed table toward the receiving table to extend over the top surface of the receiving table across the space between the tables, and is fixed to the top surfaces of the tables. A cutting edge is inserted into the space between the tables to cut the recording tape. A leader tape is fed along the top surface of the feed table toward the receiving table to extend over the top surface of the receiving table across the space between the tables by a predetermined length, and is fixed to the top surfaces of the tables. Then the cutting edge is inserted into the space to sever a leader tape piece having a predetermined length from the leader tape. The receiving table is moved with respect to the feed table in the lateral direction of the tapes so that the leader tape piece held on the receiving table is aligned with the part of the recording tape held on the feed table. Further the receiving table is moved in the longitudinal direction of the tapes to adjust the space between the opposed ends of the leader tape piece and the recording tape to an optimal value, and subsequently a splicing tape piece is applied to the opposed end portions of the leader tape piece and the recording tape.

4 Claims, 4 Drawing Figures

METHOD OF SPLICING A MAGNETIC RECORDING TAPE AND A LEADER TAPE

BACKGROUND OF THE INVENTION

1. Field of the Invention

This invention relates to a method of splicing a magnetic recording tape and a leader tape, and more particularly to a method of splicing a magnetic recording tape and a leader tape in which ends of the tapes are butted against each other and a splicing tape is applied to the opposed end portions of the tapes.

2. Description of the Prior Art

In magnetic recording tape products such as compact cassettes, video cassettes and the like, leader tapes are generally spliced to opposite ends of a magnetic recording tape and the leader tapes are fixed to a pair of reels. In the typical method of splicing the magnetic recording tape and the leader tape, ends of the magnetic recording tape and the leader tape are butted against each other and a splicing tape is applied to the opposed end portions of the tapes. The space between the ends of the spliced tapes is strictly normalized to be from 0 to 70 μm, for instance.

Conventionally, there have been used for splicing the magnetic recording tape and the leader tape a feed table and a receiving table which have top surfaces flush with each other and are positioned spaced from each other by a very small distance. A magnetic recording tape is fed along the top surface of the feed table toward the receiving table to extend over the top surface of the receiving table across the space between the tables, and is fixed to the top surfaces of the tables. A cutting edge is inserted into the space between the tables to cut the end portion extending over the receiving table off from the recording tape. Further a leader tape is fed along the top surface of the feed table toward the receiving table to extend over the top surface of the receiving table across the space between the tables by a predetermined length, and is fixed to the top surfaces of the tables. Then the cutting edge is inserted into the space between the tables to sever a leader tape piece of a predetermined length from the leader tape. One of the feed table and the receiving table is moved with respect to the other in the lateral direction of the tapes so that the leader tape piece held on the receiving table is aligned with the part of the recording tape held on the feed table. Thereafter a splicing tape piece is applied to the opposed end portions of the recording tape and the leader tape piece. This method is advantageous in that the opposed ends of the tapes conform to each other since they are respectively the cut ends on opposite sides of a cutting edge. However, there has been a problem that the space between the opposed ends of the tapes cannot be precisely controlled.

FIGS. 1 and 2 are schematic views for illustrating the drawbacks of the conventional method of splicing the recording tape and the leader tape. In FIGS. 1 and 2, reference numeral 1 denotes the recording tape or the leader tape, and the feed table and the receiving table are respectively indicated at 2 and 3. The tape 1 is fixed to the top surfaces of the tables 2 and 3, before being cut by a cutter 5, by suction force applied to a plurality of suction holes 4 which are formed in the tables 2 and 3 and are connected to a vacuum source such as a vacuum pump. Since the suction force applied to the suction holes must be limited in order to prevent damage to the tape 1, the tape 1 cannot be perfectly held in place against the force applied thereto by the cutter 5. That is, when the width L of the space between the opposed ends 2b and 3b of the tables 2 and 3 is large, cut ends of the tape 1 are apt to be drawn into the space by the cutter 5 as shown in FIG. 1. On the other hand, when the width L of the space is small, the cut ends of the tape 1 are apt to be pushed away from each other by the cutter 5 as shown in FIG. 2. When the cut ends of the tape 1 are drawn into the space, the opposed ends of the recording tape and the leader tape piece will be superposed one on another when the recording tape and the leader tape piece are aligned with each other, while when the cut ends of the tape 1 are pushed away from each other, the opposed ends of the recording tape and the leader tape piece will be spaced by an undesirably large distance when the recording tape and the leader tape piece are aligned each other.

In another splicing method, the recording tape and the leader tape are aligned with each other and fed in opposite directions respectively along the top surfaces of the tables so that their end portions are superposed one on the other and the superposed portion is cut by the cutter. After the respective cut end portions are removed, a splicing tape is applied to the opposed end portions of the tapes. Also in this method, the opposed end portions of the tapes to be spliced are apt to be drawn into the space between the feed table and the receiving table.

SUMMARY OF THE INVENTION

In view of the foregoing observations and description, the primary object of the present invention is to provide an improved method of splicing a magnetic recording tape and a leader tape in which the tapes can be spliced with the space between the opposed ends of the tapes being always set at an optimal value.

In accordance with the present invention, at least one of the receiving table and the feed table is moved in the longitudinal direction of the tapes toward or away from the other by a distance empirically determined to adjust the space between the opposed ends of the tapes to be spliced to an optimal value, after the tapes are cut and before the splicing tape is applied.

DESCRIPTION OF THE PREFERRED EMBODIMENTS

Figure 1:
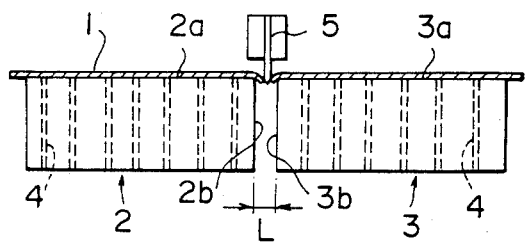
FIGS. 1 and 2 are schematic views for illustrating the behavior of a tape when it is cut.
Figure 2:
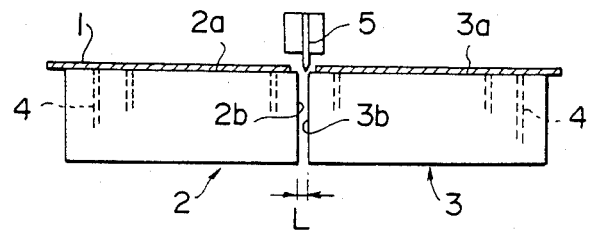
Figure 3:
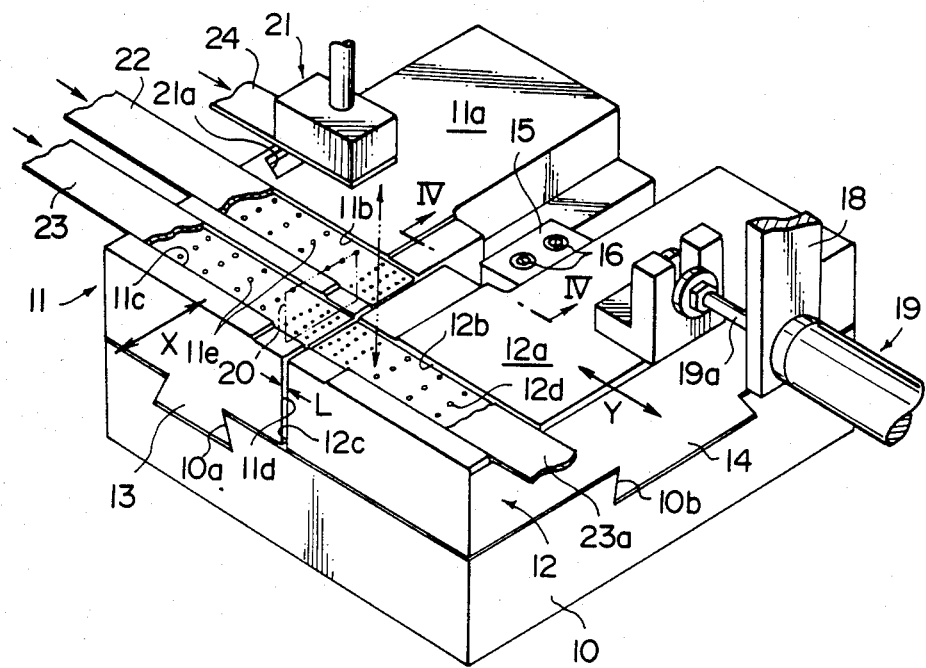
FIG. 3 is a perspective view showing an example of a device for carrying out a tape splicing method in accordance with an embodiment of the present invention.
Figure 4:
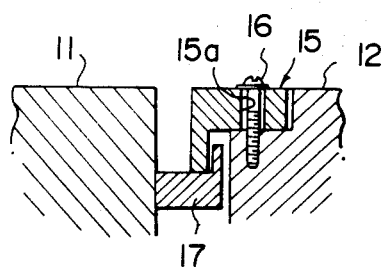
FIG. 4 is a cross-sectional view taken along line IV—IV in FIG. 3.

FIG. 3 shows an example of a device for carrying out a tape splicing method in accordance with an embodiment of the present invention. A feed table 11 and a receiving table 12 are mounted on a base 10. On the upper surface 11a of the feed table 11 are formed first and second tape guide grooves 11b and 11c which are equal to each other in width and extend in parallel to each other. The receiving table 12 is provided with a single guide groove 12b on the upper surface 12a thereof, the guide groove 12b having a width equal to those of the first and second guide grooves 11b and 11c of the feed table 11. The feed table 11 is provided on its lower surface with a slider 13 which is slidably received in a laterally extending slide channel 10a formed on the upper surface of the base 10, thereby supporting the feed table 11 on the base 10 for sliding movement in the direction of the arrow X in FIG. 3. Similarly, the receiving table 12 is mounted on the base 10 for sliding movement in the direction of the arrow Y perpendicular to the direction of the arrow X by way of engagement of a slider 14 on the lower surface thereof with a longitudinally extending slide channel 10b formed on the upper surface of the base 10. The feed table 11 and the receiving table 12 have opposed ends 11d and 12c which are spaced from each other by a very small distance L and extend in the direction of the arrow X in parallel to each other. An adjustable stopper 15 is fixed to the receiving table 12 by a pair of screws 16 which are inserted into elongated holes 15a (FIG. 4) formed in the stopper 15. The elongated holes 15a extend in the direction of the arrow Y so that the fixed position of the stopper 15 can be adjusted in the direction of the arrow Y. The stopper 15 abuts against a stopper 17 fixed to the feed table 11 to define the farthest position of the receiving table 12 from the feed table 11 in the direction of the arrow Y, i.e., the rightmost position of the receiving table 12 in FIG. 3. An air cylinder-piston unit 19 is supported by a bracket 18 and the free end of the piston 19a of the unit 19 is fixed to the receiving table 12 to move it back and forth in the direction of the arrow Y. The first and second guide grooves 11b and 11c of the feed table 11 are provided with a plurality of suction holes 11e at the base thereof, and similarly the guide groove 12b of the receiving table 12 is provided with a plurality of suction holes 12d at the base thereof.

A cutter 20 is disposed above the space between the opposed ends 11d and 12c of the feed table 11 and the receiving table 12 to be moved up and down by a driving device which is not shown. Above the cutter 20 is disposed a splicing tape applicator 21 which is movable up and down.

In splicing a magnetic recording tape and a leader tape, the feed table 11 is first moved in the direction of the arrow X by a driving mechanism such as an air cylinder-piston unit (not shown) to a first position in which the first guide groove 11b is brought into alignment with the guide groove 12b of the receiving table 12. Then the magnetic recording tape 22 is fed toward the receiving table 12 along the first guide groove 11b into the guide groove 12b of the receiving table 12 so that its leading end portion extends across the space between the opposed ends 11d and 12c by a predetermined length. Suction force is applied to the suction holes 11e and 12d to fix the recording tape 22 in the guide grooves 11b and 12b and then the cutter 20 is moved downward into the space between the opposed ends 11d and 12c of the feed table 11 and the receiving table 12 to cut the leading end portion off from the recording tape 22. Then application of suction force to the suction holes 12d in the guide groove 12b of the receiving table 12 is stopped and the cut leading end portion of the recording tape 22 in the guide groove 12b is removed. Application of suction force to the suction holes 11e of the first guide groove 11b is continued and the feed table 11 is moved to a second position shown in FIG. 3 in which the second guide groove 11c is aligned with the guide groove 12b of the receiving table 12. Then the leader tape 23 is fed toward the receiving table 12 along the second guide groove 11c into the guide groove 12b of the receiving table 12 so that its leading end portion extends beyond the space between the opposed ends of the tables 11 and 12 by a predetermined length corresponding to the length of the leader tape to be connected to the end of the recording tape 22. Suction force is applied to the suction holes 11e and 12d of the guide grooves 11c and 12b to fix the leader tape 23 in the grooves 11c and 12b. Then the cutter 20 is moved downward to sever a leader tape piece of the predetermined length from the leader tape 23. Application of suction force to the suction holes 12d of the guide groove 12b of the receiving table 12 is continued and the feed table 11 is again moved to the first position, whereby the cut leader tape piece 23a held in the guide groove 12b of the receiving table 12 is butted against the recording tape 22 held in the first guide groove 11b of the feed table 11.

In accordance with the splicing method of the present invention, one of the feed table 11 and the receiving table 12 (the receiving table 12 in this particular embodiment) is slightly moved in the longitudinal direction of the tapes (in the direction of the arrow Y) to adjust the space between the opposed ends of the tape 22 and the leader tape piece 23a before the splicing tape applicator 21 is operated. Whether the receiving table 12 is to be moved toward or away from the feed table 11 and the distance of the movement are empirically determined taking into account various conditions. In this particular embodiment, it is assumed that the conditions are such that the cut ends of the recording tape 22 or the leader tape 23 are drawn toward the cutter 20 when the cutter 20 cuts the tape. Therefore, the cylinder-piston unit 19 is actuated to pull the piston 19a away from the feed table 11 before operation of the splicing tape applicator 21 to move the receiving table 12 away from the feed table 11 by a distance empirically determined in advance to control the space between the opposed ends of the recording tape 22 and the leader tape piece 23a to an optimal value, e.g., 20 μm. The distance by which the receiving table 12 is moved is defined by the position of the stopper 15 which is adjustable.

After the space between the opposed ends of the tapes is adjusted to the optimal value, the splicing tape applicator 21 is moved downward to apply a predetermined length of splicing tape to the end portion of the leader tape piece 23a and the recording tape 22. The splicing tape applicator 21 has a plurality of suction holes (not shown) opening in the lower surface thereof. The splicing tape 24 is fed stepwise by a predetermined length and is held on the lower surface of the applicator 21 under the suction force applied through the suction holes with the side bearing thereon adhesive being directed downward. Then a cutter 21a is actuated to sever the predetermined length of splicing tape, and the applicator 21 is moved downward to press the splicing tape 24 against the opposed end portions of the recording tape 22 and the leader tape piece 23a. Subsequently, application of the suction force to the suction holes of the applicator 21 is stopped to release the splicing tape 24 and the applicator 21 is returned to the original position.

Though in the above embodiment, the receiving table 12 was moved away from the feed table 11 to adjust the space between the opposed ends of the recording tape and the leader tape to an optimal value, the receiving table 12 is moved toward the feed table 11 when it is empirically found that the tapes are apt to be pushed away from the cutter 20 when they are cut by the cutter 20. Further, the feed table may be moved instead of the receiving table to adjust the space between the opposed ends of the tapes.

I claim:

1. A method of splicing a magnetic recording tape and a leader tape comprising the steps of positioning first and second tables to be spaced from each other by a very small distance with their top surfaces being flush with each other, feeding the magnetic recording tape to extend over the top surfaces of the first and second tables across the spaces therebetween, fixing the magnetic recording tape to the top surfaces, inserting a cutter into the space between the tables to cut the recording tape, feeding the leader tape to extend over the top surfaces of the first and second tables across the space therebetween, fixing the leader tape to the top surfaces of the first and second tables, inserting the cutter into the space between the tables, aligning the part of the magnetic recording tape held on one of the tables with the part of the leader tape held on the other table, and applying a splicing tape to the opposed end portions of the part of the magnetic recording tape and the part of the leader tape, wherein the improvement comprises the steps of moving at least one of the tables toward or away from the other table in the longitudinal direction of the tapes along a straight line by a predetermined distance after the tapes are cut and before application of the splicing tape, to adjust the space between the opposed ends of said part of the recording tape and said part of the leader tape to an optimal value.

2. A method of splicing a magnetic recording tape and a leader tape as defined in claim 1 in which said magnetic recording tape and the leader tape are fixed to the top surfaces of the first and second tables by suction force.

3. A method of splicing a magnetic recording tape and a leader tape as defined in claim 1 or 2 in which said first table is provided on its top surface with first and second tape guide grooves extending perpendicularly to the space between the first and second tables in parallel to each other, and the second table is provided on its top surface with a single tape guide groove extending perpendicularly to the space between the tables, and wherein said step of feeding the magnetic recording tape comprises the steps of aligning the first tape guide groove on the first table with the groove on the second table and feeding the magnetic recording tape along the first tape guide groove toward the second table so that its leading end portion extends into the tape guide groove on the second table across the space between the tables, and said step of feeding the leader tape comprises steps of aligning the second tape guide groove with the tape guide groove on the second table after the cut leading end portion of the magnetic recording tape in the groove is removed therefrom and feeding the leader tape along the second groove toward the second table so that its leading end portion extends into the tape guide groove on the second table across the space between the tables, said part of the magnetic recording tape held on one of the tables and said part of the leader tape held on the other table being the part of the magnetic recording tape held in the first tape guide groove and the cut leading end portion of the leader tape held in the tape guide groove on the second table, respectively.

4. A method of splicing a magnetic recording tape and a leader as defined in claim 3 wherein said step of moving at least one of the tables toward or away from the other in the longitudinal includes the step of limiting such movement away from each other by said predetermined distance.

* * * * *